Nov. 12, 1940.  W. L. McGRATH  2,221,167

COOLING SYSTEM

Filed March 17, 1938

INVENTOR
William L. McGrath.
BY
George H. Fisher
ATTORNEY

Patented Nov. 12, 1940

2,221,167

UNITED STATES PATENT OFFICE 2,221,167

COOLING SYSTEM

William L. McGrath, St. Paul, Minn., assignor to Minneapolis-Honeywell Regulator Company, Minneapolis, Minn., a corporation of Delaware Application March 17, 1938, Serial No. 196,446

12 Claims. (Cl. 62—4)

This invention relates to cooling systems in general and more particularly to multiple fixture cooling systems.

An object of this invention is to provide a novel defrosting mechanism for a cooling apparatus wherein defrosting of the cooling apparatus is automatically accomplished at desired intervals.

Another object of this invention is to provide an automatic defrosting mechanism for a multiple fixture cooling apparatus whereby defrosting of all of the fixtures is accomplished substantially simultaneously at desired intervals.

Figure 1:
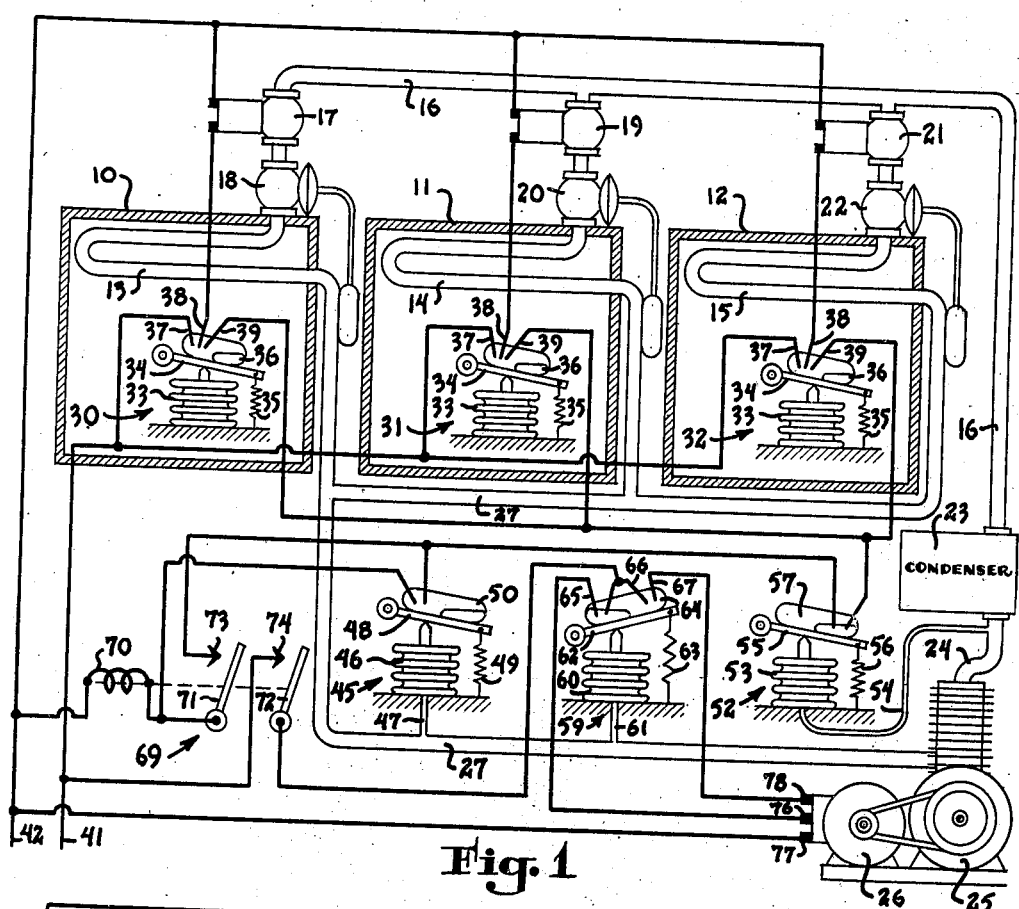
Figure 2:
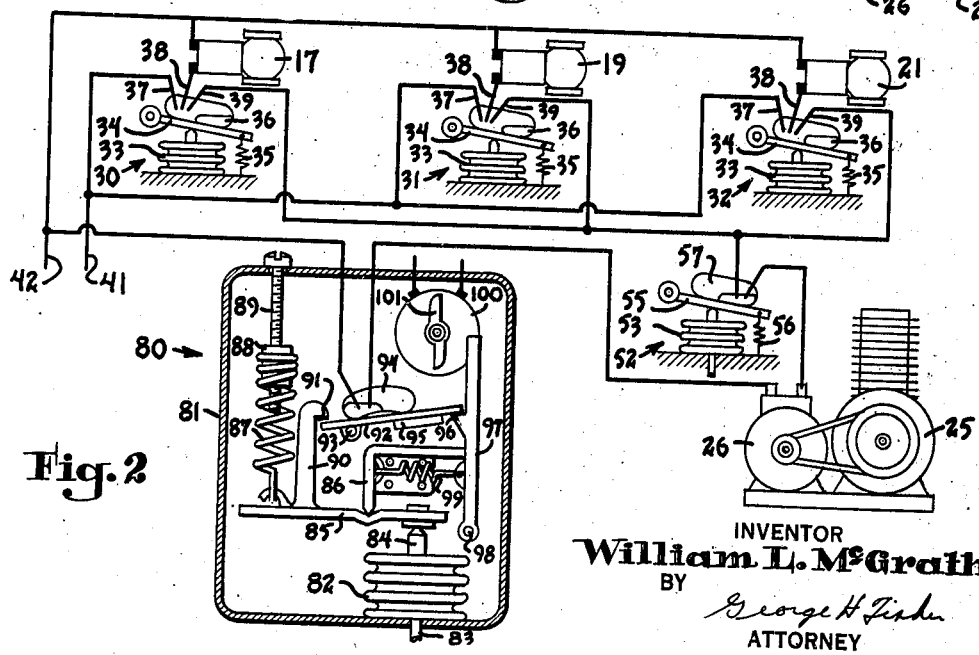

Other objects and advantages will become apparent to those skilled in the art upon reference to the accompanying specification, claims and drawing, in which Figure 1 diagrammatically illustrates one form of this invention, and Figure 2 is a diagrammatic illustration of another form of this invention.

For a more thorough understanding of this invention, reference is made to Figure 1 in which a plurality of fixtures to be cooled are designated at 10, 11 and 12. These fixtures may be any type of apparatus which it is desired to cool, such as walk-in boxes, storage compartments, water coolers, hardening chambers, etc. The fixtures 10, 11 and 12 are provided with cooling coils in the form of evaporators 13, 14 and 15. Liquid refrigerant is supplied from a liquid line 16 through a solenoid shut-off valve 17 and a thermostatic expansion valve 18 to the coil 13 of the fixture 10, through a solenoid shut-off valve 19 and a thermostatic expansion valve 20 to the coil 14 of the fixture 11, and through a solenoid shut-off valve 21 and a thermostatic expansion valve 22 to the coil 15 of fixture 12. The liquid line 16 receives its supply of liquid refrigerant from a condenser 23 which in turn receives high pressure refrigerant through a pipe 24 from a compressor 25 driven by a motor 26 which may if desired be of the multiple or two-speed type. The compressor 25 withdraws evaporated refrigerant from the coils 13, 14 and 15 through a suction or low pressure line 27. With the compressor 25 in operation, refrigerant is supplied to the coils 13, 14 and 15 for cooling their respective fixtures providing their associated solenoid shut-off valves 17, 19 and 21 are open.

Fixture 10 is supplied with a thermostat generally designated at 30, fixture 11 with a thermostat 31, and fixture 12 with a thermostat 32. Each of these thermostats may comprise a bellows 33 containing a volatile fluid for actuating a lever 34 against the action of a tension spring 35 which in turn operates a mercury switch 36 having electrodes 37, 38 and 39. When the temperature in the various fixtures is at the desired value the thermostats are in the position shown in Figure 1, but when the temperature increases above this predetermined value the bellows 33 expands to operate the mercury switch 36 to cause the mercury therein to bridge electrodes 37, 38 and 39.

Electrical power is supplied to the control system by means of line wires 41 and 42 leading from some source of power, not shown. Assume now that the temperature in the fixture 10 rises above a predetermined value to cause the mercury in the mercury switch to bridge the electrodes 37, 38 and 39. A circuit is thereupon completed from the line wire 41 through electrodes 37 and 38 of the thermostat 30 and through solenoid stop valve 17 back to the other line wire 42. This causes energization of the solenoid stop valve 17 to open the same, and deliver refrigerant to the coil 13 to decrease the temperature in the fixture 10. When the fixture temperature decreases to the desired value the mercury switch 36 of the thermostat 30 is returned to the position shown in the drawing to break the circuit to the solenoid stop valve 17 and hence stop the supply of refrigerant to the coil 13. Likewise, upon increases and decreases in temperature in the fixtures 11 and 12, the thermostats 31 and 32 respectively open and close the solenoid stop valves 19 and 21 to maintain desired temperature conditions therein.

The compressor motor 26 and hence the compressor 25 are controlled by a suction pressure controller generally designated at 45 and this controller may comprise a bellows 46 connected by a pipe 47 to the suction or low pressure line 27. This bellows 46 operates a lever 48 against the action of a tension spring 49 which in turn operates a mercury switch 50. When the suction pressure rises to a predetermined value the mercury switch 50 is tilted to cause the mercury therein to bridge the electrodes and when the suction pressure decreases below this value the switch is tilted to the position shown in Figure 1. Preferably the suction pressure controller is so adjusted that the switch 50 causes bridging of the electrodes only when the suction pressure rises to a value which is indicative of defrosting.

The compressor motor 26 and hence the compressor 25 are also controlled by a high pressure cut-out or controller generally designated at 52. This controller may comprise a bellows 53 connected by a pipe 54 to the high pressure line 24 and operates a lever 55 against the action of a tension spring 56 which in turn operates a mercury switch 57. When the high pressure of the refrigerating apparatus is at a desired value, the mercury in the switch 57 bridges the electrodes but when the high pressure rises to a predetermined high value, which may be an unsafe value, the bellows 53 is expanded to cause the mercury in the mercury switch to unbridge the electrodes.

The speed of the compressor motor 26 may be controlled by a controller generally designated at 59 and this controller may comprise a bellows 60 connected by a pipe 61 to the suction or low pressure line 27. The bellows 60 operates a lever 62 against the action of a tension spring 63 which in turn operates a mercury switch 64 having outer electrodes 65 and 67 and inner electrodes 66. When the suction pressure is above a predetermined value, the mercury in the switch 64 bridges the electrodes 65 and 66, and when the suction pressure is below this predetermined value the mercury in the switch 64 bridges the electrodes 66 and 67.

A relay or starter for starting and stopping the operation of the compressor 25 is generally designated at 69 and may comprise a relay coil 70 for operating switch arms 71 and 72 with respect to contacts 73 and 74. The arrangement is such that when the relay coil 70 is energized the switch arms 71 and 72 are moved into engagement with contacts 73 and 74, and when the relay coil 70 is deenergized these switch arms are moved out of engagement with their respective contacts by means of springs, gravity or other means, not shown.

Assume now that the compressor 25 is not operating and that the suction pressure has risen to a defrosting value whereby all of the coils 13, 14 and 15 are defrosted, the switch 50 of the suction pressure controller 45 is closed. Assume also that the high pressure condition is normal whereupon the switch 57 of the high pressure cut-out 52 is closed. If now the temperature in the fixture 10 rises above its predetermined value, the solenoid valve 17 is opened in the manner pointed out above and the compressor 25 is placed in operation by means of a circuit completed from the line wire 41 through electrodes 37 and 39 of the thermostat 30, through the switch 57 of the high pressure cut-out 52, through the switch 50 of the suction pressure controller 45 and through the relay coil 70 of the starter 69 back to the other line wire 42. Completion of this circuit causes energization of the relay coil 70 to move the switch arms 71 and 72 into engagement with their respective contacts 73 and 74. Movement of the switch arm 72 into engagement with the contact 74 completes a load circuit from the line wire 41 through contact 74, switch arm 72, electrodes 66 and 65 of the switch 64 operated by the controller 59 to a terminal 76 of the compressor motor 26 and from terminal 77 on the compressor motor 26 back to the other line wire 42. Completion of this circuit causes operation of the compressor motor 26 at high speed and hence causes operation of the compressor 25 at high speed.

Movement of the switch arm 71 into engagement with the contact 73 completes a maintaining circuit for the relay 69 which may be traced from the line wire 41 through electrodes 37 and 39 of the thermostat 30 through the switch 57 of the high pressure cut-out, through contact 73 and switch arm 71, and through relay coil 70 back to the other line wire 42. This maintaining circuit maintains the compressor 25 in operation independently of the suction pressure controller 45 so that the compressor will not be shut off until such time as the temperature within the fixture 10 decreases to the desired value. When this occurs, the thermostat 30 acts to unbridge the electrodes 37, 38 and 39 which drops out the relay 69 and which closes the solenoid stop valve 17. Since the starting circuit for the relay 69 goes through the switch 50 of the suction pressure controller 45, the compressor 25 cannot again be placed in operation until the suction pressure rises to a predetermined high value which causes defrosting of all of the coils 13, 14 and 15.

It is noted that the electrodes 37 and 39 of the fixture thermostats 30, 31 and 32 are connected in parallel so that any one of these thermostats may place the compressor in operation providing the suction pressure has risen to the defrosting value.

Assuming now that the compressor is operating in the manner pointed out above and that the cooling load decreases whereupon the suction pressure decreases. When the suction pressure decreases to a predetermined value by reason of this decrease in cooling load, the switch 64 of the controller 59 is tilted to the position opposite that shown in Figure 1 to cause the mercury to bridge the electrodes 66 and 67 whereupon a circuit is completed from the line wire 41 through contact 74 and switch arm 72 through electrodes 66 and 67 of the controller 59 to terminal 78 of the compressor motor 26, and from terminal 77 back to the other line wire 42. This causes slow speed operation of the compressor motor 26 and hence slow speed operation of the compressor 25. This slow speed operation of the compressor under light cooling loads greatly increases the efficiency of the cooling system as a whole and therefore is a very desirable feature.

From the above, it is seen that I have provided a control system for a multiple fixture mechanical refrigerating apparatus wherein the refrigerating apparatus may be placed in operation upon an increase in temperature above a predetermined value in any of the fixtures, providing the cooling coils of all of the fixtures have defrosted, wherein liquid refrigerant is supplied to the cooling coils of those fixtures calling for cooling, wherein the refrigerating apparatus is maintained in operation until the temperature in all of the fixtures has decreased to the desired value, wherein the speed of the compressor is varied in accordance with the total cooling load and wherein the compressor is shut down regardless of the call for cooling if the pressure on the high pressure side of the refrigerating apparatus becomes excessive. By reason of this arrangement, accurate temperatures are maintained in all of the fixtures and periodic defrosting of the coils of all of the fixtures is obtained whereby the efficiency of the refrigerating apparatus is increased materially. It is found that by periodically defrosting all of the fixtures in this manner, lower fixture temperatures may be maintained than could be maintained before and that the load on the compressor is decreased to a minimum.

Referring now to Figure 2, there is shown another method of accomplishing periodic defrosting of a plurality of fixtures. Here the same solenoid stop valves 17, 19 and 21, the same fixture thermostats 30, 31 and 32, the same compressor 25 and compressor motor 26, and the same high pressure cut-out 52 are utilized as in Figure 1, and hence like reference characters have been set forth. The solenoid stop valves 17, 19 and 21 are opened whenever the temperatures in their corresponding fixtures rise to a predetermined value to cause the thermostat thereof to bridge the electrodes 37 and 38. Since this sequence of operation is exactly the same as Figure 1, a further description is not considered necessary. Instead of using the suction pressure controller 45 and the relay or starter 69 of Figure 1, this modification contemplates the use of a defrosting controller generally designated at 80.

This defrosting controller 80 may comprise a casing 81 in which is mounted a bellows 82 which is connected by a pipe 83 to the suction or low pressure line 27. The bellows 82 operates a plunger 84 to rotate a lever 85 about a pivot carried by a bracket 86 suitably secured to the casing 81. Lever 85 is rotated in a clockwise direction by an adjustable tension spring 87, one end of this spring being connected to the lever 85 and the other end being connected to a nut 88 screw threadedly mounted on a screw 89 which extends through an aperture in the upper part of the casing 81. Upon an increase in suction pressure the bellows 82 expands and moves the lever 85 in a counter-clockwise direction against the action of the tension spring 87 and upon a decrease in suction pressure the tension spring 87 moves the lever 85 in the opposite direction. By suitably rotating the screw 89 the tension of the spring 87 is varied and hence the pressure setting of the defrosting control is adjusted. Lever 85 is provided with an arm 90 which carries an abutment 91 adapted to engage one end of a lever 92 pivoted at 93. Lever 92 operates a mercury switch 94 and is urged in the clockwise direction by means of a weight 95. A latch 96 carried by a lever 97 pivoted at 98 normally maintains the lever 92 in the position shown to maintain the mercury in the mercury switch 94 in bridging relation with respect to the electrodes of the switch. A spring 99 connected between the lever 97 and the bracket 86 maintains the latch 96 in operative engagement with the lever 92. A timing device, which for purposes of illustration is shown to be a synchronous motor but which may be any type of timing motor, is designated at 100 and this timing device operates a pair of cams 101 in a counter-clockwise direction. These cams 101 are adapted to engage the lever 97 to move the lever 97 in a clockwise direction against the action of the spring 99 to release the latch 96 and allow the weight 95 to tip the lever 92 to a position which causes opening of the switch 94.

Assume the parts in the position shown in Figure 2, and that the temperature in fixture 10 increases above the desired value to cause the thermostat 30 to close the switch 36, a circuit is completed to the solenoid stop valve 17 for opening the same in the manner pointed out above to supply refrigerant to the cooling coil 13 of that fixture. Also a circuit is completed from the line wire 41 through electrodes 37 and 39 of the thermostat 30 through switch 57 of the high pressure cut-out 52, through compressor motor 26 and through switch 94 of the defrosting controller 80 back to the line wire 42. Completion of this circuit causes operation of the compressor 25 and consequent delivery of refrigerant to the cooling coil 13. When the compressor is thus placed in operation the suction pressure decreases, which allows the spring 87 of the defrosting controller to move the lever 85 in a clockwise direction thereby raising the abutment 91. If during this operation the temperature in the fixture 10 is lowered to the desired value the switch 36 of the thermostat 30 is opened to close the stop valve 17 and to stop operation of the compressor 25. If on the other hand, before the thermostat 30 becomes satisfied the cam 101 of the timer 100 engages the lever 97, the lever 97 is moved in a clockwise direction to release the latch 96 from the lever 92 whereupon the weight 95 causes clockwise movement of the lever 92 to open the switch 94. This breaks the circuit to the compressor motor 26 and hence stops operation of the compressor 25. As a result, the suction pressure of the refrigerating apparatus starts to increase and when the suction pressure increases to a value where all of the coils 13, 14 and 15 are defrosted, the abutment 91 engages the lever 92 to close the switch 94 and allow the latch 96 to latch the lever 92 in the position shown in Figure 2. If at this time the thermostat 30 is still calling for cooling the compressor is again placed in operation.

Electrodes 37 and 39 of all of the thermostats 30, 31 and 32 are connected in parallel so that any one of them may place the refrigerating apparatus in operation and the refrigerating apparatus will remain in operation until all of the thermostats 30, 31 and 32 are satisfied or until the switch 94 of the defrosting controller 80 is opened. If the pressure on the high pressure side of the refrigerating apparatus becomes excessive, the switch 57 of the high pressure controller 52 is opened to shut down the compressor 25.

By reason of this arrangement, it is seen that the solenoid stop valves 17, 19 and 21 are opened whenever there is a call for cooling in their respective fixtures, that the compressor 25 is placed in operation upon a call for cooling by any of the fixtures, that the compressor remains in operation until all of the fixtures are satisfied unless in the meantime the high pressure cut-out shuts down the compressor or the defrosting controller shuts down the compressor. It is also seen that the defrosting controller 80 periodically opens the compressor circuit to stop operation thereof and will not again allow operation of the compressor until such time as defrosting has occurred in all of the fixtures. When this defrosting has occurred the suction pressure rises to a predetermined value which resets the defrosting controller 80 and allows operation of the compressor 25. Accordingly, the modification of Figure 2 accomplishes the same general results as the modification of Figure 1. However, in Figure 2 defrosting is brought about at predetermined timed intervals while in Figure 1 defrosting is brought about every time that the compressor is shut down.

Although for purposes of illustration two forms of this invention have been disclosed, other forms thereof may become apparent to those skilled in the art upon reference to this disclosure, and therefore this invention is to be limited only by the scope of the appended claims and prior art.

I claim as my invention:

1. In a multiple fixture mechanical refrigerating apparatus having an evaporator for each fixture, a condenser and a compressor for circulating refrigerant through the evaporators, the combination with said fixtures, of means responsive to the temperature at each fixture for controlling the supply of refrigerant to its corresponding evaporator, means including means responsive to the temperature at the fixtures for stopping operation of the compressor, and means for always preventing starting of the compressor until the suction pressure increases to a defrosting value for substantially simultaneously defrosting all of the evaporators each time that the compressor is stopped.

2. In a multiple fixture mechanical refrigerating apparatus having an evaporator for each fixture, a condenser and an electrically operated compressor for circulating refrigerant through the evaporators, the combination with said fixtures, of a thermostat at each fixture, a starting circuit for the electrically operated compressor including the thermostats in parallel, whereby any thermostat may start the compressor, a suction pressure operated switch moved to a closed position when the suction pressure rises to a defrosting value and included in the starting circuit in series with the thermostats to prevent starting of the compressor until the evaporators are defrosted, and a maintaining circuit for the electrically operated compressor completed when the compressor is operating and including the thermostats in parallel whereby the compressor is maintained in operation until all of the thermostats are satisfied.

3. In a multiple fixture mechanical refrigerating apparatus having an evaporator for each fixture, a condenser and an electrically operated compressor for circulating refrigerant through the evaporators, the combination with said fixtures, of a thermostat at each fixture, a starting circuit for the electrically operated compressor including the thermostats in parallel, whereby any thermostat may start the compressor, a suction pressure operated switch moved to a closed position when the suction pressure rises to a defrosting value and included in the starting circuit in series with the thermostats to prevent starting of the compressor until the evaporators are defrosted, a maintaining circuit for the electrically operated compressor completed when the compressor is operating and including the thermostats in parallel whereby the compressor is maintained in operation until all of the thermostats are satisfied, and means responsive to the temperature at each fixture for controlling the supply of refrigerant to its respective evaporator.

4. In a multiple fixture mechanical refrigerating apparatus having an evaporator for each fixture, a condenser and an electrically operated compressor for circulating refrigerant through the evaporators, the combination with said fixtures, of switching means operated in response to the cooling load on the refrigerating apparatus and closed upon an increase in cooling load, a switch operated in response to suction pressure and closed when the suction pressure rises to a defrosting value, a starting circuit for the electrically operated compressor including the switching means and the switch in series to start the compressor when the cooling load increases and after defrosting of all of the evaporators occurs, a maintaining circuit for the electrically operated compressor completed through the switching means when the compressor is operating to maintain the compressor in operation until the cooling load decreases, and means responsive to the temperature at each fixture for controlling the supply of refrigerant to its associated evaporator.

5. In a multiple fixture mechanical refrigerating apparatus having an evaporator for each fixture, a condenser and a compressor for circulating refrigerant through the evaporators, the combination with said fixtures, of thermostatic means responsive to the temperature at each fixture for controlling the supply of refrigerant to its corresponding evaporator, means including said thermostatic means arranged in parallel for controlling the operation of the compressor so that any thermostatic means is capable of starting operation of the compressor upon a call for cooling while all of the thermostatic means are required to be satisfied to stop operation of the compressor, and means for preventing starting of the compressor until the suction pressure increases to a defrosting value for substantially simultaneously defrosting all of the evaporators.

6. In a multiple fixture mechanical refrigerating apparatus having an evaporator for each fixture, a condenser and a compressor for circulating refrigerant through the evaporators, the combination with said fixtures, of thermostatic means responsive to the temperature at each fixture for controlling the supply of refrigerant to its corresponding evaporator, means including said thermostatic means arranged in parallel for controlling the operation of the compressor so that any thermostatic means is capable of starting operation of the compressor upon a call for cooling while all of the thermostatic means are required to be satisfied to stop operation of the compressor, means for stopping operation of the compressor when the head pressure increases to a predetermined value, and means for preventing starting of the compressor until the suction pressure increases to a defrosting value for substantially simultaneously defrosting all of the evaporators.

7. In a multiple fixture mechanical refrigerating apparatus having an evaporator for each fixture, condenser means and compressor means for circulating refrigerant through the evaporators, the combination with said fixtures, of means responsive to the temperature at each fixture for controlling the supply of refrigerant to its corresponding evaporator, means including means responsive to the temperature at the fixtures for stopping operation of the compressor means, means for always preventing starting of the compressor means until the suction pressure increases to a defrosting value for substantially simultaneously defrosting all of the evaporators each time that the compressor means is stopped, and means responsive to the load on the refrigerating apparatus for varying the capacity of the compressor means.

8. In a multiple fixture mechanical refrigerating apparatus having an evaporator for each fixture, condenser means and compressor means for circulating refrigerant through the evaporators, the combination with said fixtures, of means responsive to the temperature at each fixture for controlling the supply of refrigerant to its corresponding evaporator, means including means responsive to the temperature at the fixtures for stopping operation of the compressor means, means for always preventing starting of the compressor means until the suction pressure increases to a defrosting value for substantially simultaneously defrosting all of the evaporators each time that the compressor means is stopped, and means responsive to suction pressure for varying the speed of the compressor means in accordance with the load on the refrigerating apparatus.

9. In a multiple fixture refrigerating apparatus having an evaporator for each fixture, condenser means and compressor means for circulating refrigerant through the evaporators, the combination with said fixtures, of means responsive to a temperature condition at each fixture for controlling the supply of refrigerant to its associated evaporator and for also controlling the starting and stopping of the compressor means, means for intermittently causing substantially simultaneous defrosting of all of the evaporators, and means responsive to the load on the refrigerating apparatus for varying the capacity of the compressor means.

10. In a multiple fixture refrigerating apparatus having an evaporator for each fixture, condenser means and compressor means for circulating refrigerant through the evaporators, the combination with said fixtures, of means responsive to a temperature condition at each fixture for controlling the supply of refrigerant to its associated evaporator and for also controlling the starting and stopping of the compressor means, means for intermittently causing substantially simultaneous defrosting of all of the evaporators, and means responsive to suction pressure for varying the speed of the compressor means in accordance with the load on the refrigerating apparatus.

11. In a refrigerating apparatus having evaporator means for controlling a condition, condenser means and compressor means for circulating refrigerant through the evaporator means, the combination with said fixtures, of control means responsive to the condition controlled by the evaporator means, control means responsive to a condition which is a measure of evaporator temperature, means controlled by both control means to start operation of the compressor means only when the condition controlled by the evaporator means increases to a predetermined value and the evaporator temperature increases to a defrosting value, and means responsive to the load on the refrigerating apparatus for varying the capacity of the compressor means.

12. In a refrigerating apparatus having evaporator means for controlling a condition, condenser means and compressor means for circulating refrigerant through the evaporator means, the combination with said fixtures, of control means responsive to the condition controlled by the evaporator means, control means responsive to suction pressure, means controlled by both control means to start operation of the compressor means only when the condition controlled by the evaporator means increases to a predetermined value and the suction pressure increases to a defrosting value, and means responsive to suction pressure for varying the speed of the compressor means in accordance with the load on the refrigerating apparatus.

WILLIAM L. McGRATH.